April 30, 1929.   C. C. BRYANT   1,711,039
CAKE COMPRESSOR
Filed June 12, 1926

Inventor
Carrel C. Bryant.
By his Attorneys
Redding, Greeley, O'Shea & Campbell

Patented Apr. 30, 1929.

1,711,039

UNITED STATES PATENT OFFICE.

CARREL C. BRYANT, OF LANDING, NEW JERSEY.

CAKE COMPRESSOR.

Application filed June 12, 1926. Serial No. 115,536.

In the patent to Arthur Wright and Frank W. Young No. 1,472,574 dated October 30, 1923, there is disclosed a process and apparatus for removing a deposit from the surface of a deposit forming instrumentality and preserving it in a form in which it may be effectively dried or otherwise treated or handled. The invention is there illustrated as applied to a rotary drum filter and involves, in one embodiment, the building up of filter cake about a re-enforcing medium and its maintenance substantially intact for transportation away from the filter. In the apparatus disclosed in the patent the action of the re-enforcing instrumentality is rendered more efficient by densifying or compressing the filter cake and compacting it upon the reenforcement. An endless belt is pressed against the surface of the cake by rollers thereby compressing or densifying the cake, rendering it homogeneous and uniform, by forcing solid particles of the cake into the voids left by the liquid withdrawn by the filter and causing the cake to be securely bound in the interstices of the re-enforcing medium. While theoretically and under ideal conditions the filter cake formed on the periphery of a filter drum is of constant thickness or depth, in commercial operations the depth sometimes varies due to a difference in the rate of deposit of the particles from a variety of causes. The present invention seeks to provide cake compressing instrumentalities which shall conform substantially to the surface of a cake even though of irregular depth and apply a uniform pressure thereto. Accordingly the compressor belt is caused to press against the surface of the cake by means of an axially flexible roller capable of conforming to the configuration of the cake. More particularly the roller comprises a plurality of separate rollers of relatively short transverse dimensions independently displaceable toward and away from the cake. Preferably there are disposed upon a transverse pivoted shaft a plurality of separate discs of substantially the same diameter having axial apertures of a diameter greater than the diameter of the shaft so as to permit relative displacement of proximate discs in conformity with the variations in the surface of the cake.

In order that the invention may be clearly understood the same will now be described with greater particularity in connection with the accompanying drawings illustrating a preferred embodiment thereof, in which.

As described in the patent the filter cake $a$ forms on the surface of the filter cloth $b$ upon the periphery of the filter $c$ and in the interstices of the re-enforcement $d$ by the deposit of the solid particles thereabout. It is densified or compressed and rendered homogeneous and uniform by passing solid particles into the voids left by the liquid removed by the filter and caused to be securely bound in and about the re-enforcement by a continuous belt $d$ traveling about idlers $e$ supported from the frame $f$ and pressed against the surface of the cake by the rollers $g$. These rollers are shown as journaled in arms $h$ pivoted on the frame as at $f'$ and may be spring pressed against the belt or weighted to the desired degree to obtain the requisite pressure. Rollers $g$ or either one of them, are substantially flexible in an axial direction in order that they may conform to the surface of the cake even though its surface is irregular due to an unequal rate of deposit of the particles of which it is formed whereby every portion of the cake may be subjected to the requisite compressive action. As illustrated the roller is formed of a plurality of discs or annuli $g'$ of substantially equal diameter rotatably carried by a transverse shaft $i$ carried by the ends of the arms $h$ and preferably secured against rotation by the pins $i'$. The discs are formed with a central aperture $g^2$ for the passage of the shaft $i$ of a diameter greater than the diameter of the shaft, the internal diameters of the annuli being so proportioned as to permit a predetermined degree of eccentric motion or radial displacement so that the discs may follow the changes in the surface of the filter cake and contact with it for densifying action at all times.

Figure 1:
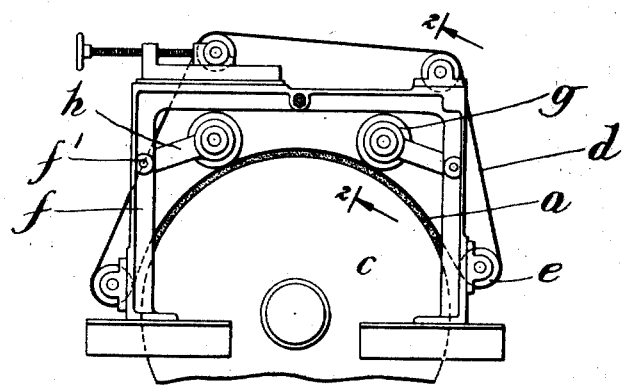
Figure 1 is a view in side elevation showing so much of a rotary drum type filter as is necessary to an understanding of the invention shown applied thereto.
Figure 2:
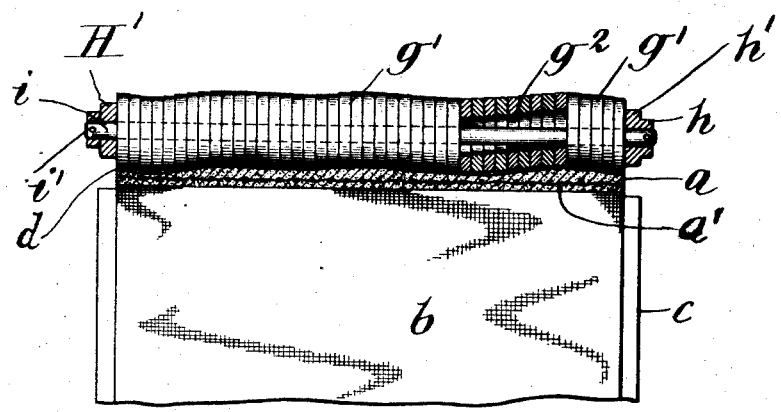
Figure 2 is a view taken in the plane indicated by the line 2—2 in Figure 1, looking in the direction of the arrows, and showing, partly in section, the flexible pressure roll automatically adjustable to varying depths of filter cake.

In the preferred embodiment, the annuli are positioned on the shaft by means of the flanges $h'$ formed on the ends of the arms $h$. Obviously idling washers may be substituted therefor as shown at the left of Figure 2 at H'.

By the construction described a flexible roller has been provided which will exert a uniform pressure upon a surface even though different points on the surface be at varying distances, respectively, from the normal axis of the roller.

Various modifications may be made in the configuration of the co-operating parts without departing from the spirit and scope of the invention as set forth in the appended claim.

What I claim is:

In combination, a rotary drum type filter having a frame and a drum upon which filter cake is deposited, rollers carried by the frame, an endless compressor belt carried by the rollers and adapted to contact with and compress the filter cake located upon the filter drum and local axially flexible compression rolls contacting with that portion of the endless belt which is in contact with the filter cake on the filter drum and thereby densifying and compacting the filter cake, said rolls comprising transversely extending shafts pivotally carried on the frame and a plurality of relatively thin annuli of substantially the same external and internal diameters carried by the shaft, the internal diameters of the annuli being materially greater than the diameter of the shaft whereby the roller can follow irregularities in the filter cake, and applies substantially uniform pressure to all parts of an irregular filter cake.

This specification signed this 10 day of June A. D. 1926.

CARREL C. BRYANT.